United States Patent
Smith (10) Patent No.: US 8,335,065 B2
(45) Date of Patent: Dec. 18, 2012

(54) OVERVOLTAGE PROTECTION IN A POWER SUPPLY

(75) Inventor: Robert B. Smith, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1513 days.

(21) Appl. No.: 11/742,522

(22) Filed: Apr. 30, 2007

(65) Prior Publication Data

US 2008/0266740 A1  Oct. 30, 2008

(51) Int. Cl.
*H02H 3/20*  (2006.01)

(52) U.S. Cl. ........... 361/91.1; 361/92; 361/93.1; 361/90

(58) Field of Classification Search ............... 361/91.1, 361/18, 90, 91.5, 92, 93.1, 93.2, 101
See application file for complete search history.

(56) References Cited

U.S. PATENT DOCUMENTS

| 5,774,321 | A |  | 6/1998 | Kim et al. | |
| 5,808,453 | A | * | 9/1998 | Lee et al. | 323/224 |
| 6,031,743 | A | * | 2/2000 | Carpenter et al. | 363/65 |
| 6,229,292 | B1 |  | 5/2001 | Redl et al. | |
| 6,329,801 | B1 |  | 12/2001 | Zuniga et al. | |
| 6,473,280 | B1 |  | 10/2002 | Buxton et al. | |
| 2004/0227495 | A1 | * | 11/2004 | Egan et al. | 323/272 |
| 2005/0001600 | A1 |  | 1/2005 | Morales | |
| 2007/0035899 | A1 | * | 2/2007 | Covi et al. | 361/56 |

FOREIGN PATENT DOCUMENTS

JP  10-262330  * 9/1998

* cited by examiner

*Primary Examiner* — Rexford Barnie
*Assistant Examiner* — Nicholas Ieva (57) ABSTRACT

A method for protecting against over voltage in a power supply comprises monitoring current amplitude and direction on an output connection of a power source that combines power from a plurality of power sources, and determining occurrence of a fault condition of the monitored power source based on the current amplitude and direction. In a fault condition of the monitored power source, operation of the monitored power source subject to the fault condition is terminated while continuing operation of the plurality of power sources exclusive of the monitored power source.

24 Claims, 6 Drawing Sheets

OVERVOLTAGE PROTECTION IN A POWER SUPPLY

BACKGROUND

Voltage regulators, for example DC-DC converters, supply a stable power source to an electronic system. Voltage regulators are typically designed to maintain terminal voltage sources within specified limits even in variable input voltage and/or load conditions. Voltage regulators are typically susceptible to faults or failures, which can cause the output voltage of the regulator to go outside a suitable range during a fault. A fault in the voltage regulator can damage a device using the regulated DC voltage or render the device unusable.

A fault may not be detected until the affected voltage regulator is out of tolerance as determined by a fault detection device that monitors the output voltage of the regulator. To avoid catastrophic failure of the system, redundant voltage regulators can be used to ensure reliability, coupled in parallel to a load device so that if one voltage regulator fails, another continues to maintain a stable supply voltage.

In a system with a redundant power source configuration such as a 2N or N+1 configuration, over-voltage protection methods typically involve monitoring of the associated power rail to determine an upper voltage limit of correct operation. Action can be taken, usually in hardware, to protect sensitive circuitry on the power rail in the event that the monitored voltage rail exceeds the upper limit by removing power to the rail. As a result of the fault, the entire system may shut down to protect the sensitive circuitry.

Conventional multiple-supply systems determine over-voltage by simply monitoring one or more output voltages. With one voltage, the source of the error in a multi-sourced power system cannot be determined. Over-voltage conditions can progress very quickly. As a result, the most sensitive supply shuts down first, followed almost instantly by the remaining supplies with the faulty supply which detects the error is also shut down. The system is protected but all power to the load is lost.

SUMMARY

An embodiment of a method for protecting against over voltage in a power supply comprises monitoring current amplitude and direction on an output connection of a power source that combines power from a plurality of power sources, and determining occurrence of a fault condition of the monitored power source based on the current amplitude and direction. In a fault condition of the monitored power source, operation of the monitored power source subject to the fault condition is terminated while continuing operation of the plurality of power sources exclusive of the monitored power source.

BRIEF DESCRIPTION OF THE DRAWINGS

Embodiments of the invention relating to both structure and method of operation may best be understood by referring to the following description and accompanying drawings.

DETAILED DESCRIPTION

In several power supply embodiments and associated methods, redundant power supply over-voltage protection can be implemented to maintain supplied power without system operation interruption.

In normal operation a power supply or a set of power supplies that supply regulated power on a common bus or rail do so by monitoring output voltage and output current on an ongoing basis and adjusting output power (voltage and/or current) based on the feedback received from these two variables.

Other implementations can monitor other variables as well, for example temperature and the like, to enable supply of reliable power and prevent damage to the system, power supply(s), and/or load(s). The output voltage is regulated by the voltage feedback to a control element and current is limited by current feedback to the same or a different control element.

The illustrative power supply, logic, system, and method embodiments are useful, but not limited to use, in systems that supply power to a load via multiple power sources in a 2N or N+1 configuration. Some examples of protection methods include monitoring of a subject power rail to determine an upper voltage limit of correct operation. Action is taken, often in hardware, to protect sensitive circuitry on the power rail in the event that one of the sources causes the monitored voltage rail to exceed the upper limit. A possible deficiency in the method is that detecting the over-voltage condition at the power rail does not give an indication that distinguishes between the power source that has caused the fault and any other that has not. As a result of a fault, the entire system is often shut down to protect the sensitive circuitry. The illustrative power supply, logic, system, and method embodiments described herein enable determination of the identity of the faulty power source and deactivation without affecting the operation of the other power sources, therefore enabling the system to continue to function normally while the faulted source is replaced.

Power supply topologies can be classified in many ways. Converters that have DC isolation (isolated) between the power source and load and converters that do not (non-isolated) are examples of one type of classification. Converter failures in various types of power supplies have different characteristics. Most over-voltage failures tend to be catastrophic. That is, the onset of the condition may be very rapid and extreme. Many malfunctions, regardless of topology, can cause an over-voltage condition. The method of protection may be somewhat different depending upon specific topology. The illustrative structures and techniques enable detection and determination of a source of an over-voltage condition and can be applied to almost all topologies.

Figure 1:
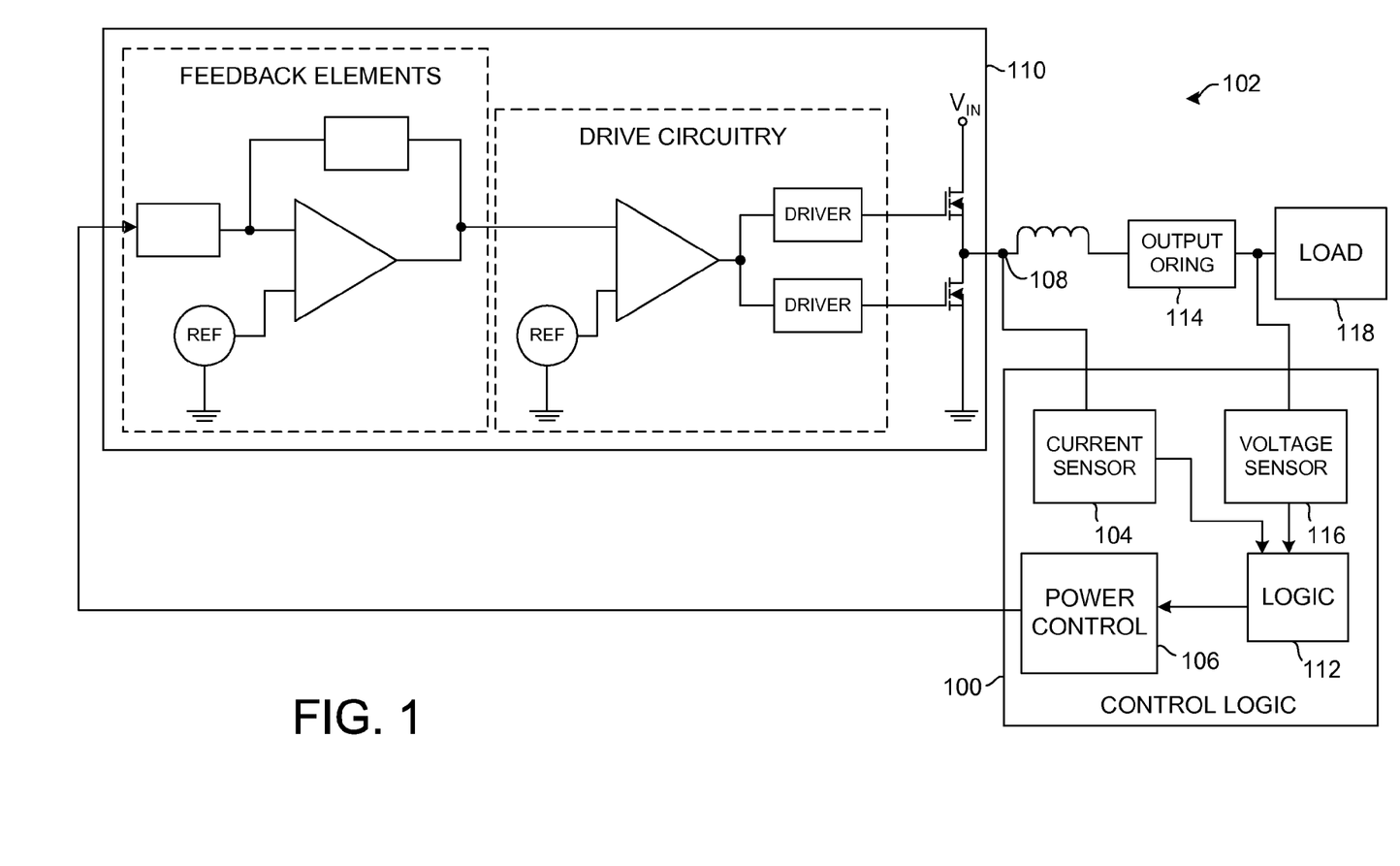
FIG. 1 is a schematic block and circuit diagram illustrating an embodiment of control logic that is configured for protecting against over voltage in a power supply.

Referring to FIG. 1, a schematic block and circuit diagram depicts an embodiment of control logic 100 that is configured for protecting against over voltage in a power supply 102. The control logic 100 comprises a current sensor 104 and a power controller 106. The current sensor 104 is coupled to an output connection 108 of a monitored power source 110 that combines output power with a plurality of power sources. The current sensor 104 is configured for monitoring current amplitude and direction sourced by the monitored power source 110. The power controller 106 is coupled to the current sensor 104 and receives a current signal indicative of output power of the monitored power source 110. The power controller 106 is also coupled to the monitored power source 110 and transmits a power control signal. The power controller 106 comprises a logic 112 that determines occurrence of a fault condition of the monitored power source 110 based on the current amplitude and direction. In a fault condition of the monitored power source 110, the logic 112 terminates operation of the monitored power source that is subject to the fault condition while continuing operation of the other power sources.

In some embodiments, the control logic 100 can further comprise a voltage sensor 116 coupled to the output connection 108 of the monitored power source that combines output power with multiple power sources 110, the voltage sensor is configured for monitoring voltage. The power controller 106 can determine occurrence of a fault condition of the monitored power source 110 based on an over-voltage condition prior to or simultaneously with the current amplitude and direction condition.

The current sensor 104 is used for monitoring current in the particular monitored power source 110 in contrast to measurements at the load or rail. Monitoring or current amplitude and direction that is specific to the power source 110 enables detection of a local over-voltage condition and controlled action to cut back power supplied by the source 110.

In an illustrative embodiment, the power controller 106 can comprise a logic 112 that determines occurrence of the fault condition of the monitored power source when current amplitude that exceeds a predetermined threshold current level.

The control logic 100 can further comprise an output ORing element 114 that is coupled to the current sensor 104 and is configured to combine power from the multiple power sources so that a fault condition of the monitored power source which causes the output voltage of the monitored power source to fall below a predetermined first threshold level causes the ORing element 114 to disconnect the monitored power source that is subject to the fault condition from connection to the plurality of power sources. The output ORing element 114 is further configured so that a fault condition of the monitored power source that causes output voltage of the monitored power source to increase above a predetermined second threshold level causes the output ORing element to pass the output voltage to the connection of the plurality of power sources. The multiple power sources other than the monitored power source collectively reduce output voltage and output current.

Some embodiments may eliminate the ORing element 114 and use control of the power source 110 to generate a suitable power for combining.

Systems with redundant power systems such as systems with 2N or N+1 power supply systems can use diodes to combine "OR" the power output terminals from multiple sources at a common node that feeds the power rail. Other schemes for "ORing" of sources can be used whether active or passive, such as a field-effect transistor (FET) or other transistor implementation, a power switch, silicon-controlled rectifier (SCR), a relay, a Hall Effect device, a current-through low pass filter, or the like. For purposes of the disclosure herein, ORing implementations are functionally equivalent to diode "ORing" circuits. ORing circuits enable isolation for each source in a failure event that causes the circuit to fail to produce adequate voltage to supply the load. Isolation prevents back-flow of energy into the defective, malfunctioning, or disabled power source. When one source malfunctions and has an output voltage that falls below the desired level, the "ORing" diode removes the malfunctioning source from the common node and the other sources increase the output to make up the difference.

In a system that detects multiple voltages, a fault can be determined more precisely in some topologies, specifically topologies with diode ORing circuits, but not all topologies. For example, a wire-ORed or hard-wired connection does not present multiple voltages for measurement.

In some embodiments, the control logic 100 can comprise an output ORing element 114 coupled to the current sensor 104 that is configured to combine power from multiple power sources, and a voltage sensor 116 coupled between the output ORing element 114 and a load 118. The power controller 106 can comprise a logic 112 that monitors current amplitude and direction at the current sensor 104 and monitors common node voltage at the voltage sensor 116. The logic 112 can determine absence of a fault condition for a voltage that is less than a predetermined threshold voltage and current amplitude that is less than a predetermined threshold current. The logic 112 can determine a fault condition for the voltage that is greater than the predetermined threshold voltage.

The power controller 106 can further comprise a logic 112 that monitors current amplitude and direction at the current sensor 104 with respect to a current upper limit for detecting a source internal over-current limit that determines status of the monitored power source 110 and monitors voltage amplitude at the voltage sensor 116 with respect to a voltage upper limit for detecting a system failure.

If a malfunction causes the source to generate an excessive voltage, the ORing element 114 passes the higher voltage on to the common node. Other power sources that are functioning correctly detect the increased rail voltage and attempt to compensate by reducing voltage and therefore current output. As a result, each properly functioning source detects a decrease of voltage, for example at an anode of an "ORing" diode with respect to the common node or rail voltage.

By monitoring the anode voltage and current as well as the common node voltage at the cathode of the ORing diode, each supply can determine the supply is the cause of the fault. If the Anode to Cathode voltage is less than a specified voltage, for example about 0.4 volts, and the output current is less than a predetermined limit, which is application specific, then the supply is not causing the over-voltage condition and continues to operate.

If, on the other hand, the Anode to Cathode voltage is greater than the specified voltage, the supply is deemed to be causing the over-voltage condition and is shut down.

When the faulty power source shuts down, the output voltage begins to drop back to the target voltage and the remaining power sources adjust output power to maintain the desired voltage. The adjustment occurs very quickly so that the output voltage at no time exceeds or sags below safe operating limits.

Fault detection can be implemented with two over-voltage limits. A first upper limit is a source-internal over-voltage limit which is used to determine the status of the individual power source. Each power source independently monitors the internal output voltage. A second higher over-voltage limit is used for system monitoring. In the event of a catastrophic power source failure, the second limit may be used to shut down all power to the rail to protect sensitive circuitry.

Figure 2:
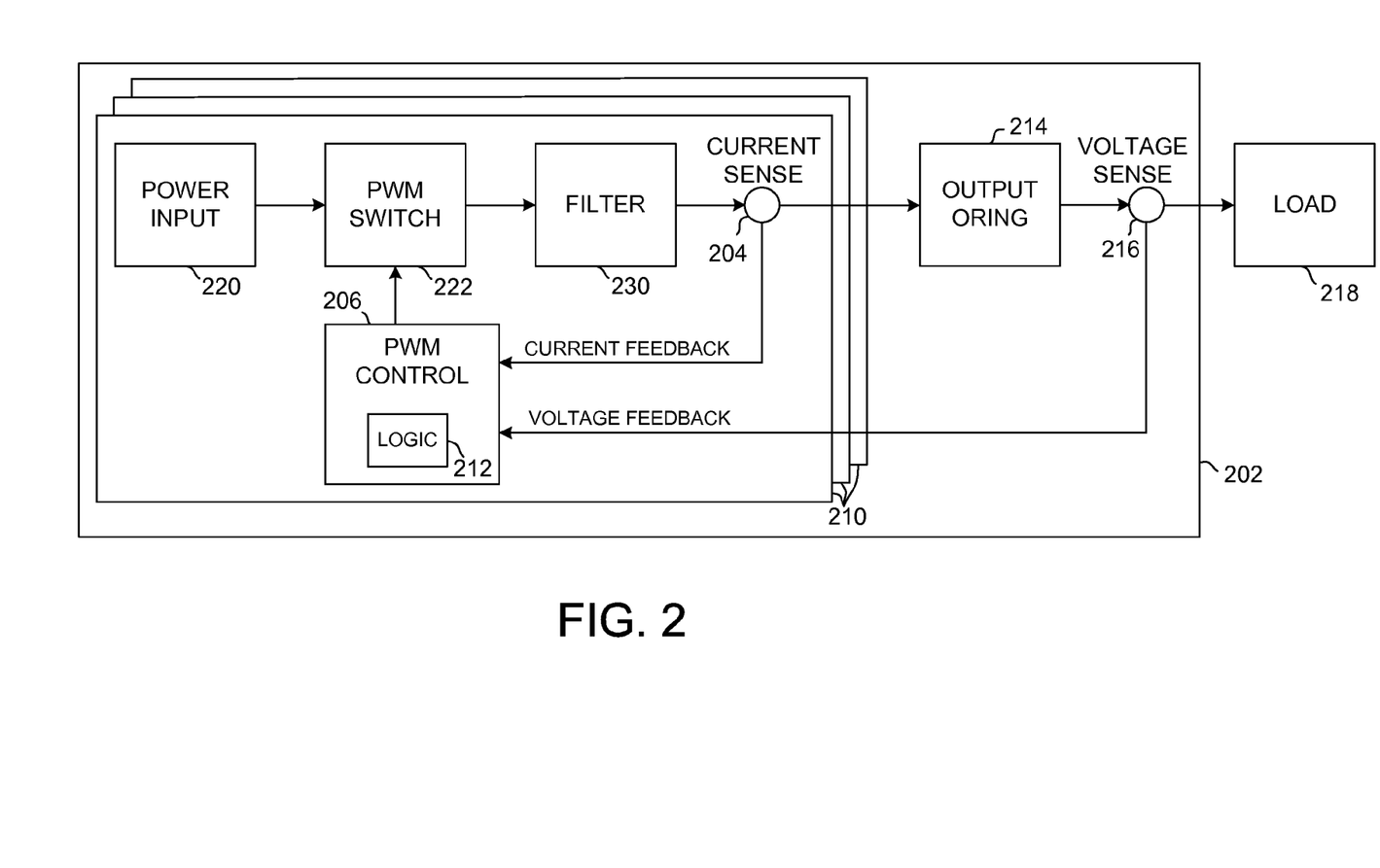
FIG. 2 is a schematic block and circuit diagram illustrating an embodiment of a power supply that is protected against over voltage.

Referring to FIG. 2, a schematic block and circuit diagram illustrates an embodiment of a power supply 202 that is protected against over voltage. The power supply 202 comprises one or more power sources 210 although the illustrative over voltage protection is most useful in a power supply configuration that includes redundant and thus multiple power sources 210. An individual power source 210 comprises a power input interface 220, a pulse width modulator (PWM)

switch 222 coupled to the power input interface 220 that receives input power for conversion to a form suitable for application to a load 218. The power source 210 further comprises a current sensor 204 that is coupled to the PWM switch 222 and is configured for monitoring amplitude and direction of current from the PWM switch 222. An output power ORing element 214 is coupled to the PWM switch 222 and combines output power with multiple power sources in a redundant system for supplying combined power to the load 218. The power source 210 further comprises a power controller 206 that is communicatively coupled to the current sensor 204 for receiving a current signal indicative of output power from the PWM switch 222, and coupled to the PWM switch 222 for transmitting a power control signal. The power controller 206 comprises a logic 212 that determines occurrence of a fault condition of the monitored power source 210 based on the current amplitude and direction. For a fault condition of the monitored power source 210, the logic 212 terminates operation of the monitored power source that is subject to the fault condition while continuing operation of the other remaining power sources.

The power input interface 220 can be any suitable component or element such as a power cord, input filter, or the like.

In various embodiments, the PWM switch 222 can be replaced by other components and devices such as direct current (DC)-DC converter, other various pulse width modulator (PWM) switches, delta modulator (DM) switches. In a typical arrangement the switch 222 drives a voltage through a set of field effect transistors (FETs). For example, the illustrative structures and techniques can be typically used with DC-DC converter of standard topology. A particular PWM switch 222 can be either synchronous or asynchronous and can be controlled by either passive or active components.

In an illustrative embodiment, the power controller 206 can comprise a logic 212 that determines occurrence of the fault condition of the monitored power source when current amplitude that exceeds a predetermined threshold current level.

A voltage sensor 216 can be coupled between the output power ORing element 214 and the load 218 and monitors voltage amplitude of combined power supplied to the load 218.

The output ORing element 214 can be used to combine power from the multiple or redundant power sources so that a fault condition of the monitored power source 210 sufficient to cause the output voltage of the monitored power source 210 to fall below a predetermined first threshold level causes the output ORing element 214 to disconnect the monitored power source 210 that caused the fault condition from the multiple power sources. The power supply 202 can also be controlled so that a fault condition of the monitored power source that causes output voltage of the monitored power source to increase above a predetermined second threshold level causes the output ORing element 214 to pass the output voltage to the connected multiple or redundant power sources. The power sources other than the monitored power source 210 collectively reduce output voltage and output current.

In power supply embodiments arranged with a voltage sensor 216 coupled between the output ORing element 214 and a load 218, the power controller 206 can comprise a logic 212 that monitors current amplitude and direction at the current sensor 204 and monitors common node voltage at the voltage sensor 204. The logic 212 determines absence of a fault condition for a voltage that is less than a predetermined threshold voltage and a current amplitude that is less than a predetermined threshold current, and determines a fault condition for the voltage that is greater than the predetermined threshold voltage.

In some embodiments, the logic 212 can monitor current amplitude and direction at the current sensor 204 in comparison to a current upper limit to enable detection of a source internal over-current limit that determines status of the monitored power source 210. The logic 212 can also monitor voltage amplitude at the voltage sensor 216 in comparison to a voltage upper limit to enable detection of a system failure.

For an over-voltage condition that results from failure to voltage supplied by the PWM switch 222, current flow at the current sensor 204 is altered in a detectable manner so that the PWM controller 206 can shut down the PWM switch 222 in appropriate conditions.

As depicted in FIG. 2, in some embodiments the power source 210 can further comprise a filter 230 coupled between the pulse width modulator (PWM) switch 222 and the current sensor 204 that filters power spikes from the a power input interface 220 and the PWM switch 222.

The illustrative power supply 202 enables detection and determination of a faulty power source, and shutting down the faulty power source without affecting the operation of the other power sources, therefore allowing the system to continue to function normally while the faulted source is replaced.

Figure 3A:
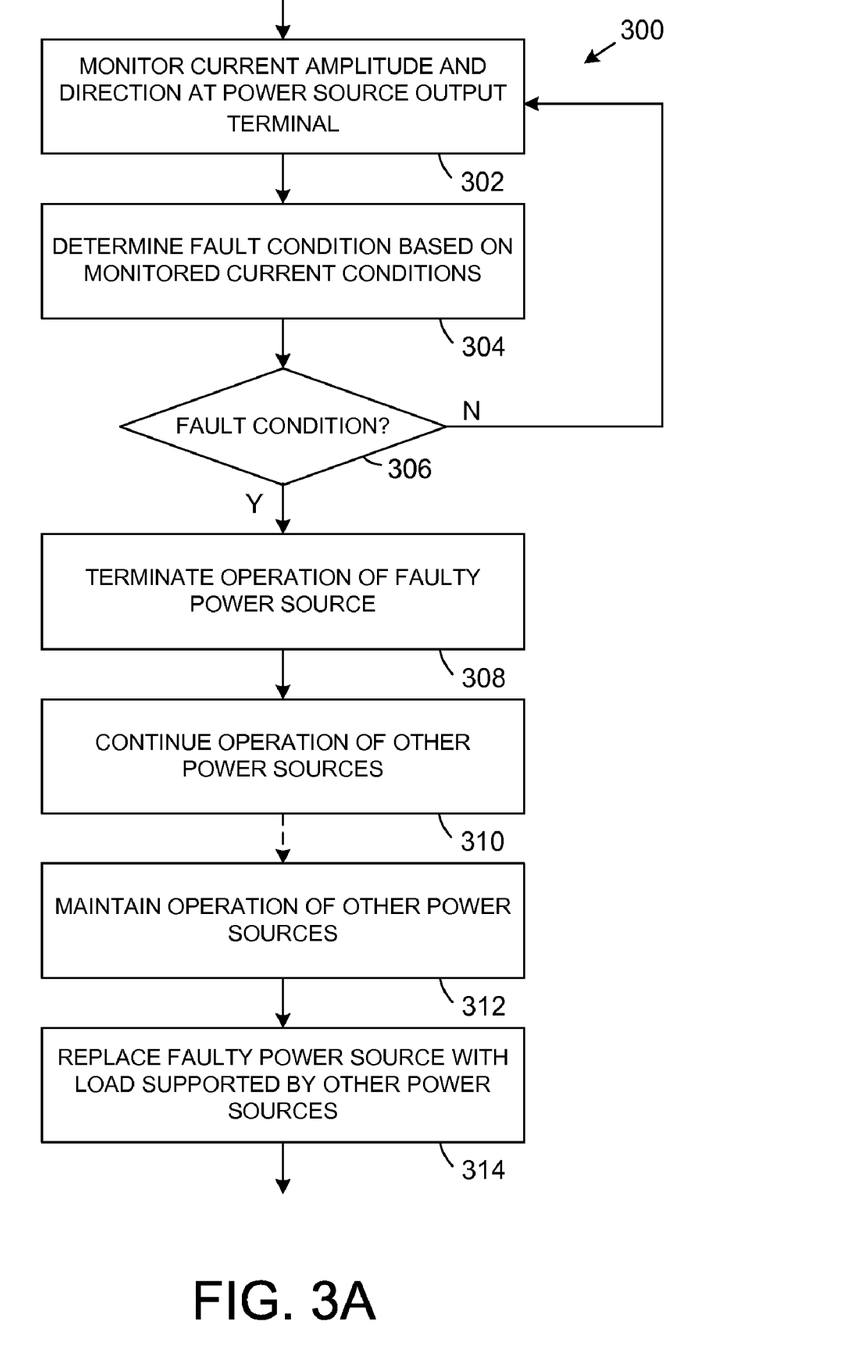
FIGS. 3A through 3E are flow charts showing one or more embodiments or aspects of a method for detecting failure or fault in a voltage regulator.

Referring to FIGS. 3A through 3F, flow charts illustrate one or more embodiments or aspects of a method for detecting failure or fault in a voltage regulator. FIG. 3A depicts a method 300 for protecting against over voltage in a power supply. The method 300 comprises monitoring 302 current amplitude and direction at an output connection of a power source that combines power from multiple or redundant power sources and determining 304 whether a fault condition of the monitored power source has occurred based on the monitored current amplitude and direction. In a fault condition 306 of the monitored power source, operation of the monitored power source that is subject to the fault condition is terminated 308 while continuing 310 operation of the other power sources.

For example in some embodiments, a fault condition can be determined or detected 304 when the current amplitude of the monitored power source exceeds a predetermined threshold current level.

The over voltage protection method 300 can be used to maintain 312 operation of the plurality of power sources exclusive of the monitored power source, thereby enabling 314 replacement of the power source that is subject to the fault condition while the load is supported by the remaining operative power sources.

In some embodiments, voltage also can be at the output connection of the power source that combines power from the plurality of power sources. A fault condition of the monitored power source can be determined based on an over-voltage condition prior to or simultaneously with the current amplitude and direction condition.

Figure 3B:
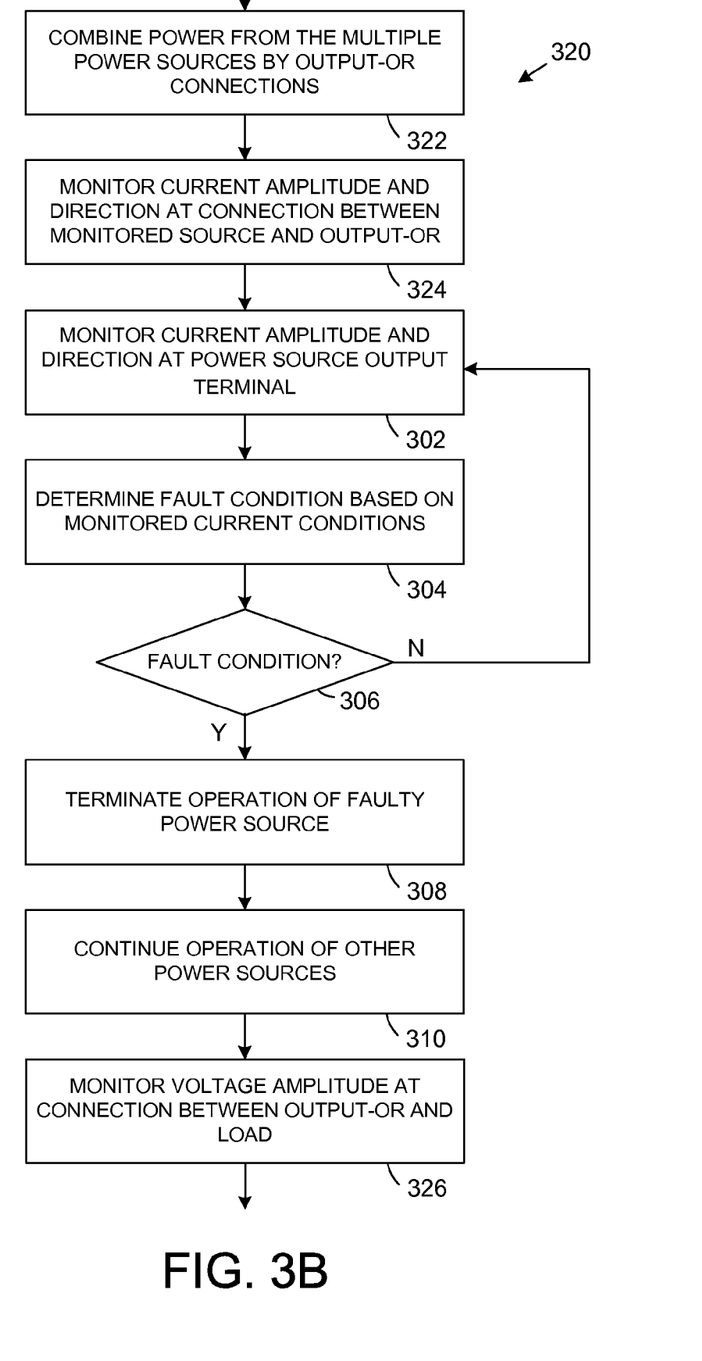

Referring to FIG. 3B, a schematic flow chart illustrates an embodiment of a method 320 of over voltage protection for a redundant-source power supply. The method 320 comprises combining 322 power from the plurality of power sources by output-OR connections. Current amplitude and direction can be monitored 324 at a connection between the monitored power source and output-OR connections. Voltage amplitude can be monitored 326 at a connection between the output-OR connections and a load.

Figure 3C:
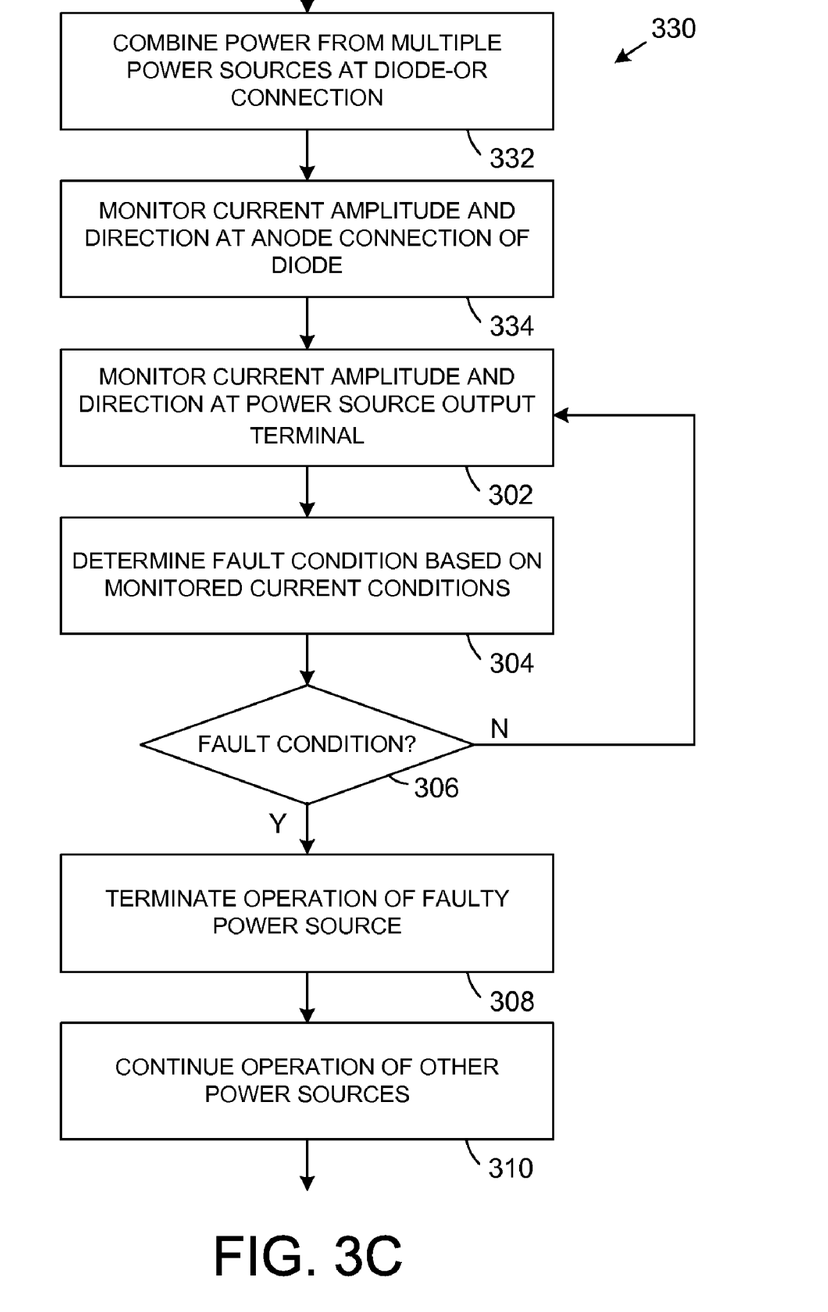

Referring to FIG. 3C, a schematic flow chart illustrates an embodiment of a method 330 of over voltage protection for a redundant-source power supply. The method 330 comprises combining 332 power from the plurality of power sources at a diode-OR connection. Current amplitude and direction can be monitored 334 at an anode connection of a diode coupled between the monitored power source and the connection between the plurality of power sources.

Figure 3D:
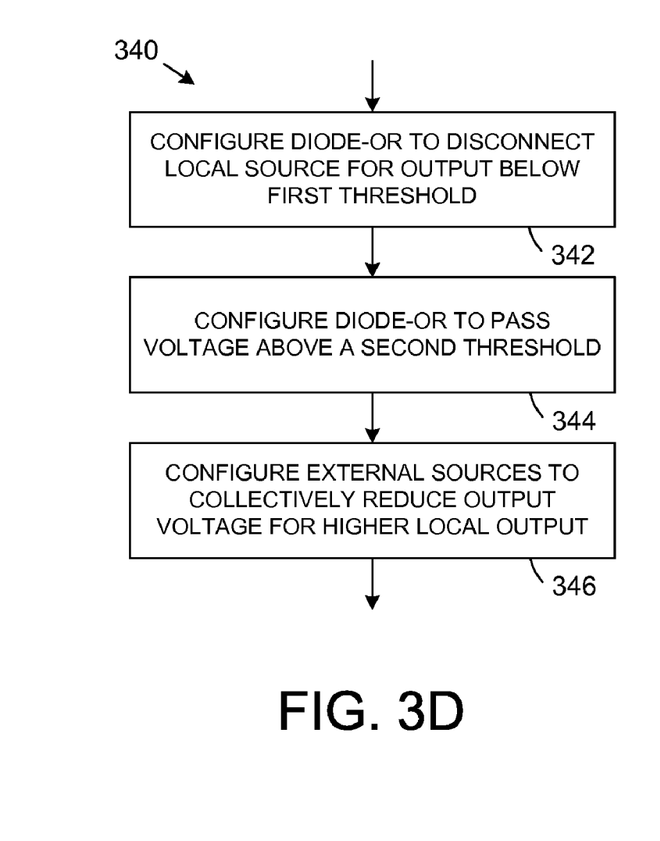

Referring to FIG. 3D, a flow chart depicts an aspect 340 of an embodiment of an over voltage protection method. When a monitored power source malfunctions so that voltage output falls below a desired level, the ORring diode removes the monitored source connection from the common node so that other sources increase voltage output to make up the difference. Thus, the diode-OR connection can be configured 342 so that a fault condition of the monitored power source that causes output voltage of the monitored power source to fall below a predetermined first threshold level causes the diode to disconnect the faulty power source from the other power sources.

In contrast, for a malfunction that causes the source to output an excessive voltage, the ORing diode passes the higher voltage on to the common node. Other power sources that are functioning correctly detect the increased rail voltage and attempt to compensate by reducing voltage and thus supplied current.

As a result each properly functioning source detects a decrease of voltage at the anode of the ORing diode with respect to the common node or rail voltage. By monitoring the anode voltage and current as well as the common node voltage at the cathode of the ORing diode, each supply can be analyzed for determination as the cause of the fault. If anode-to-cathode voltage is less than a specified voltage, for example about 0.4 volts, and the output current is less than an application-specific predetermined limit, then the supply is not the cause of the over voltage condition and continues to operate. Accordingly, the diode-OR connection can be further configured 344 whereby a fault condition of the monitored power source that causes output voltage of the monitored power source to increase above a predetermined second threshold level causes the diode to pass the output voltage to the connection of the multiple power sources. The power sources other than the monitored power source collectively reduce 346 output voltage and output current.

If a malfunction causes the power source to generate an excessive voltage, the ORing diode passes the higher voltage onward to the common node.

Figure 3E:
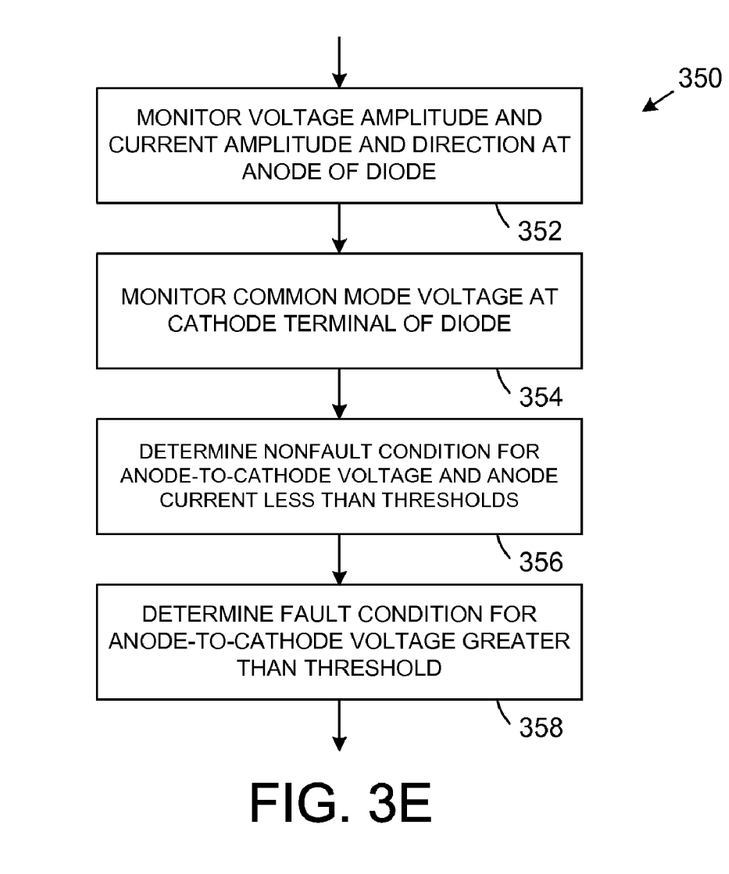

Referring to FIG. 3E, a flow chart depicts an aspect 350 of an embodiment of an over voltage protection method. Voltage amplitude and current amplitude and direction can be monitored 352 at an anode terminal of a diode coupled to the output connection of the power source. Common mode voltage can be monitored 354 at a cathode terminal of the diode. Absence of a fault condition can be determined 356 for an anode-to-cathode voltage that is less than a predetermined threshold voltage and the anode current amplitude less than a predetermined threshold current. A fault condition can be determined 358 for an anode-to-cathode voltage that is greater than the predetermined threshold voltage.

In some embodiments, voltage amplitude and current amplitude and direction can be monitored 352 at the anode terminal of the diode with respect to a first upper limit for detecting a source internal over-voltage and over-current limit that determines status of the monitored power source. Voltage amplitude and current amplitude and direction can be monitored 354 at the anode terminal of the diode with respect to a second upper limit that is higher than the first upper limit for detecting a system failure.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method for protecting against over voltage in a power supply comprising:
   monitoring current amplitude and direction at an output connection of a monitored power source that combines power from a plurality of power sources;
   providing a sensor signal that is indicative of the monitored current amplitude and direction;
   determining, via logic, occurrence of a fault condition of the monitored power source based on the monitored current amplitude and direction indicated by the sensor signal; and
   disconnecting the monitored power source from connection to the plurality of power sources in response to a fault condition of the monitored power source that causes an output voltage of the monitored power source to fall below a predetermined first threshold level.

2. The method according to claim 1 further comprising:
   in a fault condition of the monitored power source, terminating operation of the monitored power source subject to the fault condition while continuing operation of the plurality of power sources exclusive of the monitored power source.

3. The method according to claim 1 further comprising:
   determining, via the logic, occurrence of the fault condition of the monitored power source based on an over-voltage condition prior to or simultaneously with the current amplitude and direction condition.

4. The method according to claim 1 further comprising:
determining the occurrence of the fault condition of the monitored power source for a current amplitude that exceeds a predetermined threshold current level.

5. The method according to claim 1 further comprising:
maintaining operation of the plurality of power sources exclusive of the monitored power source;
enabling replacement of the power source subject to the fault condition.

6. The method according to claim 1 further comprising:
combining power from the plurality of power sources by output-OR connections;
monitoring current amplitude and direction at a connection between the monitored power source and output-OR connections;
monitoring the output voltage amplitude at a connection between the output-OR connections and a load.

7. The method according to claim 1 further comprising:
combining power from the plurality of power sources by diode-OR connections, field-effect transistor (FET)-OR connections, or wired-OR connections; and
monitoring the current amplitude and direction at an anode connection of a diode, at a field-effect transistor, or at a wire coupled between the monitored power source and the connection between the plurality of power sources.

8. The method according to claim 7 further comprising:
configuring the diode-OR connections or the field-effect transistor (FET)-OR connections whereby the fault condition of the monitored power source that causes the output voltage of the monitored power source to fall below the predetermined first threshold level causes the diode or the FET to disconnect the monitored power source subject to the fault condition from connection to the plurality of power sources; and
configuring the diode-OR connection or the FET-OR connection whereby a fault condition of the monitored power source that causes the output voltage of the monitored power source to increase above a predetermined second threshold level causes the diode or the FET to pass the output voltage to the connection of the plurality of power sources, the plurality of power sources other than the monitored power source collectively reducing output voltage and output current.

9. The method according to claim 7 further comprising:
monitoring the output voltage amplitude and current amplitude and direction at an anode terminal of a diode coupled to the output connection of the monitored power source;
monitoring a common node voltage associated with the plurality of power sources at a cathode terminal of the diode;
determining absence of a fault condition for an anode-to-cathode voltage that is less than a predetermined threshold voltage and the anode current amplitude is less than a predetermined threshold current; and
determining a fault condition for an anode-to-cathode voltage that is greater than the predetermined threshold voltage.

10. The method according to claim 9 further comprising:
monitoring the output voltage amplitude and current amplitude and direction at the anode terminal of the diode with respect to a first upper limit for detecting a source internal over-voltage and over-current limit that determines status of the monitored power source; and
monitoring the voltage amplitude and current amplitude and direction at the anode terminal of the diode with respect to a second upper limit that is higher than the first upper limit for detecting a system failure.

11. Control logic configured for protecting against over voltage in a power supply comprising:
a current sensor coupled to an output connection of a monitored power source that combines output power with a plurality of power sources, the current sensor configured for monitoring current amplitude and direction sourced by the monitored power source;
a power controller coupled to the current sensor for receiving a current signal indicative of output power of the monitored power source and coupled to the monitored power source for transmitting a power control signal, the power controller comprising a logic that determines occurrence of a fault condition of the monitored power source based on the current amplitude and direction as monitored by the current sensor, and in a fault condition of the monitored power source, terminating operation of the monitored power source subject to the fault condition while continuing operation of the plurality of power sources exclusive of the monitored power source; and
an output ORing element coupled to the current sensor and configured to combine power from the plurality of power sources whereby a fault condition of the monitored power source that causes an output voltage of the monitored power source to increase above a predetermined threshold level causes the output ORing element to pass the output voltage to the connection of the plurality of power sources, the plurality of power sources other than the monitored power source collectively reducing output voltage and output current.

12. The control logic according to claim 11 further comprising:
a voltage sensor coupled to the output connection of the monitored power source that combines output power with a plurality of power sources, the voltage sensor configured for monitoring the output voltage at the output connection of the power source that combines power from the plurality of power sources; and
the power controller determining occurrence of the fault condition of the monitored power source based on an over-voltage condition prior to or simultaneously with the current amplitude and direction condition.

13. The control logic according to claim 11 further comprising:
the power controller comprising a logic that determines occurrence of the fault condition of the monitored power source when current amplitude that exceeds a predetermined threshold current level.

14. The control logic according to claim 11 further comprising:
an output ORing element coupled to the current sensor and configured to combine power from the plurality of power sources whereby a fault condition of the monitored power source that causes the output voltage of the monitored power source to fall below a predetermined first threshold level causes the output ORing element to disconnect the monitored power source subject to the fault condition from connection to the plurality of power sources.

15. The control logic according to claim 11 further comprising:
an output ORing element coupled to the current sensor and configured to combine power from the plurality of power sources;
a voltage sensor coupled between the output ORing element and a load; and
the power controller comprising a logic that monitors current amplitude and direction at the current sensor and monitors a common node voltage associated with the plurality of power sources at the voltage sensor and determines absence of a fault condition for a voltage that is less than a predetermined threshold voltage and a current amplitude that is less than a predetermined threshold current and determines a fault condition for the voltage that is greater than the predetermined threshold voltage.

16. The control logic according to claim 15 further comprising:
the power controller comprising a logic that monitors current amplitude and direction at the current sensor with respect to a current upper limit for detecting a source internal over-current limit that determines status of the monitored power source and monitors voltage amplitude at the voltage sensor with respect to a voltage upper limit for detecting a system failure.

17. A power supply comprising:
at least one power source comprising:
a power input interface;
a pulse width modulator (PWM) switch coupled to the power input interface for receiving input power;
a current sensor coupled to the PWM switch and configured for monitoring current amplitude and direction from the PWM switch;
an output power ORing element coupled to the PWM switch and configured for combining output power with a plurality of power sources for supplying combined power to a load, the output power ORing element being further configured to deactivate the power supply from supplying the combined power to the load in response to a fault condition that causes an output voltage to fall below a first predetermined threshold level and to keep the power supply activated to supply the output voltage to the load in response to a fault condition that causes the output voltage to increase above a second predetermined threshold level; and
a power controller coupled to the current sensor for receiving a current signal indicative of output power from the PWM switch and coupled to the PWM switch for transmitting a power control signal, the power controller comprising a logic that determines occurrence of a fault condition of the monitored power source based on the current amplitude and direction that is monitored by the current sensor, and in a fault condition of the monitored power source, terminating operation of the monitored power source subject to the fault condition while continuing operation of the plurality of power sources exclusive of the monitored power source.

18. The power supply according to claim 17 further comprising:
the at least one power source further comprising:
a voltage sensor coupled to the output connection of the monitored power source that combines output power with a plurality of power sources, the current sensor configured for monitoring voltage at the output connection of the power source that combines power from the plurality of power sources; and
the power controller determining occurrence of a fault condition of the monitored power source based on an over-voltage condition prior to or simultaneously with the current amplitude and direction condition.

19. The power supply according to claim 17 further comprising:
a voltage sensor coupled between the output power ORing element and the load and configured for monitoring voltage amplitude of combined power supplied to the load.

20. The power supply according to claim 17 further comprising:
a filter coupled between the pulse width modulator (PWM) switch and the current sensor that filters power spikes from the power input interface and the PWM switch.

21. The power supply according to claim 17 further comprising:
the power controller comprising a logic that determines occurrence of the fault condition of the monitored power source when current amplitude that exceeds a predetermined threshold current level.

22. The power supply according to claim 17, wherein the plurality of power sources other than the monitored power source collectively reduce output voltage and output current in response to the fault condition that causes the output voltage to increase above the second predetermined threshold level.

23. The power supply according to claim 17 further comprising:
a voltage sensor coupled between the output ORing element and a load; and
the power controller comprising a logic that monitors current amplitude and direction at the current sensor and monitors a common node voltage associated with the plurality of power sources at the voltage sensor and determines absence of a fault condition for a voltage that is less than a predetermined threshold voltage and a current amplitude that is less than a predetermined threshold current and determines a fault condition for the voltage that is greater than the predetermined threshold voltage.

24. The power supply according to claim 23 further comprising:
the power controller comprising a logic that monitors current amplitude and direction at the current sensor with respect to a current upper limit for detecting a source internal over-current limit that determines status of the monitored power source and monitors voltage amplitude at the voltage sensor with respect to a voltage upper limit for detecting a system failure.

* * * * *